No. 832,905. PATENTED OCT. 9, 1906.
G. E. HARTER.
AGRICULTURAL IMPLEMENT.
APPLICATION FILED MAR. 19, 1906.

WITNESSES:
D. C. Walter
Cornell Schreiber

INVENTOR.
George E. Harter,
By Owen & Owen,
His attorneys.

UNITED STATES PATENT OFFICE.

GEORGE E. HARTER, OF TOLEDO, OHIO, ASSIGNOR TO THE OHIO IMPLEMENT COMPANY, OF TOLEDO, OHIO, A CORPORATION OF OHIO.

AGRICULTURAL IMPLEMENT.

No. 832,905.     Specification of Letters Patent.     Patented Oct. 9, 1906.

Application filed March 19, 1906. Serial No. 306,759.

*To all whom it may concern:*

Be it known that I, GEORGE E. HARTER, a citizen of the United States, and a resident of Toledo, in the county of Lucas and State of Ohio, have invented certain new and useful Improvements in Agricultural Implements; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to agricultural implements, and has special reference to the class of implements which are convertible or changeable for use as a harrow, rake, hoe, weeder, mulcher, or combination weeder and mulcher, or the like.

An object of my invention is the provision of an implement of the class described which is of simplified and improved construction and capable of having its tool-carrying frame easily and quickly removed from the main frame thereof to permit the securing of other attachments to said main frame.

A further object of my invention is the provision, in combination with the implement-frame, of tool or gang bars which are relatively adjustable to various positions and angles and are also capable of having their tools adjusted relatively thereto as the work to be performed or the nature or number of the tools used may require.

A further object of my invention is the provision in a hand-operated implement of this class of a frame of simplified and improved construction which has its handles or push-bars attached at the center of draft on or in line with the axle of the carrying wheel or wheels, thus giving the operator control of his machine as to depth of furrow and making it run easily and guide quickly.

To these ends my invention consists of the novel features of construction, combination, and arrangement of the parts, as is hereinafter fully described, and illustrated in the accompanying drawings, in which—

Figure 1:
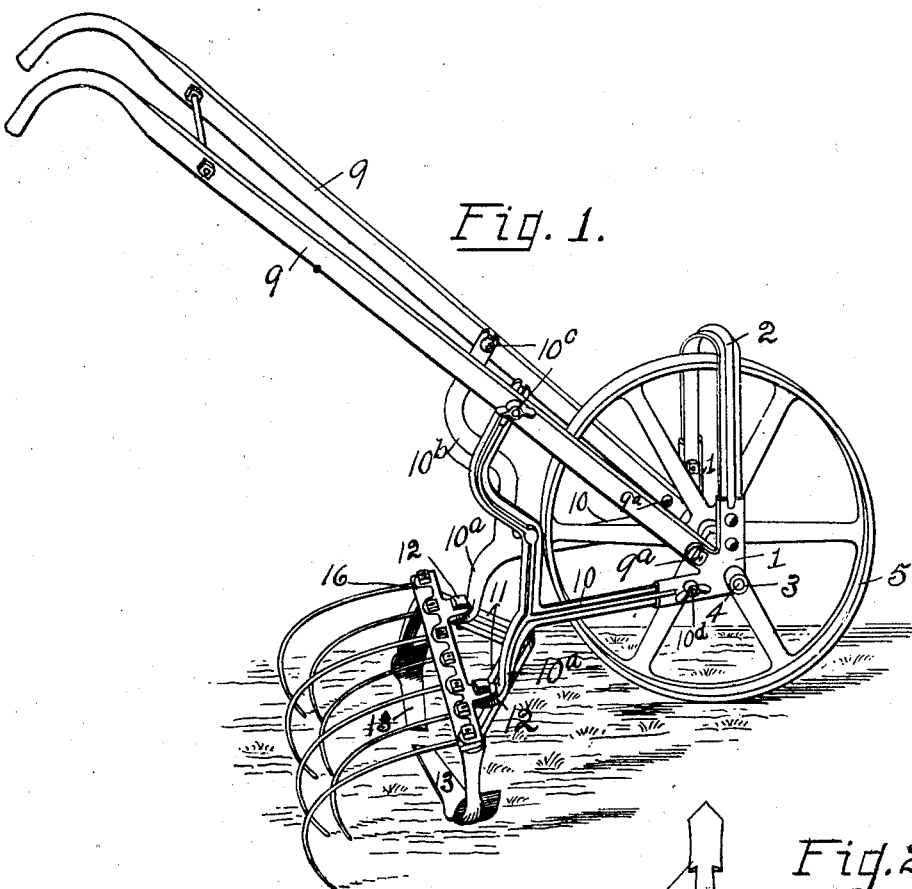
Figure 3:
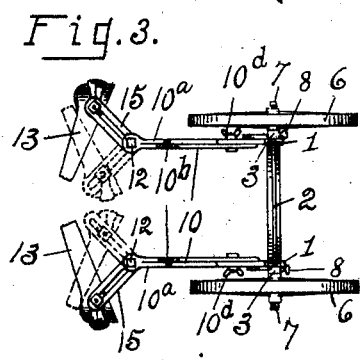
Figure 2:
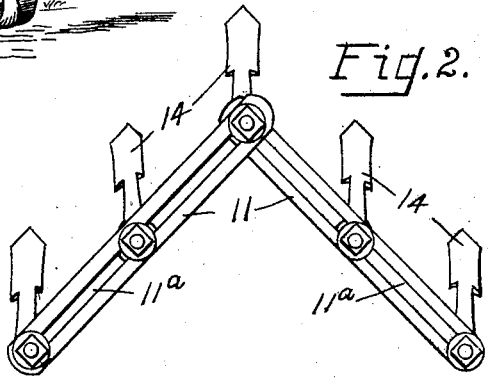

Figure 1 is a view in perspective of a single-wheeled implement comprising my invention equipped with hoes and a rake or mulcher attachment. Fig. 2 is a plan of the relatively adjustable tool-bars equipped with a plurality of harrow or cultivator teeth. Fig. 3 is a plan view of the frame, partly in section and equipped with double wheels and with short adjustable tool-bars carrying hoes.

Referring to the drawings, 1 1 represent two oppositely-disposed L-shaped brackets or castings, which are firmly spaced apart by the vertical arch or inverted-U-shaped member 2, which has its terminals securely bolted or otherwise suitably secured to the vertically-disposed arms of the brackets or castings 1 1. These brackets are each formed with a bearing 3, which bearings receive the opposite ends of a shaft 4, carrying the wheel 5 intermediate thereof. Should double wheels 6 be employed to adapt the machine to run astride a row, the stub-axles 7 thereof may be secured within the bearings 3 by thumb or set screws 8, as shown in Fig. 3. Handle-bars 9 9 are attached at their inner ends, as at $9^a$, to the brackets 1 in radial alinement with the bearings 3, so as to center the line of draft directly on the axle of the wheel or wheels.

Secured to and projecting rearwardly from the horizontal arm of each bracket 1 is a frame member or drag-bar 10, which is provided with a tailpiece $10^a$, having an apertured foot and with a vertical arm $10^b$, which has its upper end preferably slotted and removably secured to the superimposed handle by a bolt and winged nut, as at $10^c$. The frame members are secured to the brackets 1 by a bolt passing through registering apertures therein and being locked by a winged nut, as at $10^d$, thus enabling said frame members to be easily and quickly removed for the purpose of packing or securing other trailer attachments to the implement.

A pair of tool or gang bars 11 are shown in Fig. 1 as being secured by bolts 12 to the tailpieces $10^a$ of the frame members 10 and as carrying hoes or weeding tools 13 at their outer ends and in Fig. 2 as being separated from the implement and carrying a plurality of cultivator-teeth 14. Each bar 11 is provided substantially its entire length with a slot $11^a$, through which the bolts securing the inner ends of the bars together, the bolts securing the tools thereto, and the bolts securing them to the tailpieces 10ª adjustably pass. These bars are adjustably bolted together at their inner or contiguous ends to enable them to be placed in any desired relative position of adjustment, whether it be with the bars straight across or disposed in intersecting planes. This adjustable feature of the bars 11 is an important one in implements of this class, as good work depends upon the placing of the bars in different relative positions to suit different styles of tools and the nature of the work to be performed.

When using a single tool in connection with each frame member 10 it is preferable to employ a tool-bar of similar shape but shorter than the tool-bars 11, as is shown at 15 in Fig. 3. These tool-bars are not connected at their inner or contiguous ends as are the longer ones, thus rendering the attached tool capable of adjustment to any point within a circle having the said bar as its radius. It is also apparent that the tools may have their positions reversed and be secured to the tool-bars 15 at any point intermediate their ends, as shown by dotted lines in Fig. 3, thus permitting them to be placed in numerous positions or in positions which are most suited to the character of the work to be performed.

16 represents a rake or mulching tool, which is advantageously used in combination with the hoes or weeding-tools 13, as shown in Fig. 1. This rake trails behind the hoes 13, having its body or cross-bar attached to the tailpieces 10ª of the frame by the bolts 12 and effects a thorough mulching or pulverizing of the soil after the hoes 13 have passed under the surface thereof and severed the roots of the weeds. Neither of these tools (the hoes or the rake) when used alone is sufficient to cause an effective extermination of weeds, as the hoes slide under the surface of the soil and cut the roots of the weeds, but do not mulch or tear the soil apart so as to kill the weeds, while the rake-teeth pulverize or mulch the soil and loosen it around the roots of the weeds without cutting such roots or tearing them from the soil, thus tending to cultivate rather than exterminate the weeds. By the employment of both the hoes and the rake, as shown, the roots of the weeds are first cut by the hoes and then turned up and exposed to the sun by the agitating or mulching effect of the rake-teeth, thus combining to effectually kill and exterminate the weeds.

The arched and open form of the frame of the implement enables it when two wheels are used, as shown in Fig. 3, to run astride a row of vegetables or the like being cultivated or worked. When so used, the tool-bars and tools are adjusted to provide the desired intermediate space.

It will thus be apparent that my improved implement comprises a frame which can be easily and quickly disassembled for the purpose of packing, or portions of it removed for the substitution therefor of other attachments, that the tools carried thereby are capable of being readily and quickly adjusted to different positions or changed as the nature or growth of the product being worked may require, and that hoes and a rake or mulcher may be used in combination to effect a perfect extermination of weeds or other obnoxious growths.

Having thus described my invention, what I claim as new, and desire to secure by Letters Patent, is—

1. An agricultural implement comprising a wheeled frame, horizontal tool-bars carried by the frame, each being adjustable, radially and angularly relative to a fixed point on the frame, and soil-working tools carried by said bars.

2. An agricultural implement, comprising a wheeled frame, horizontal tool-bars carried by the frame, each being adjustable to any point within a circle having the bars as its radius, and soil-working tools adjustably carried by the bars.

3. An agricultural implement, comprising a wheeled frame having spaced trailer members, slotted tool-bars attached to said members and adjustable relative thereto and to each other whereby they may be placed in longitudinal alinement or in intersecting planes, and a tool or tools carried by each tool-bar, substantially as described.

4. An agricultural implement, comprising opposite bearing-brackets, an arched spacing member connecting said brackets, a wheeled support for said brackets, handles attached to the brackets in line with their bearing, a frame member removably attached to each bracket and its attached handle, a slotted tool-bar adjustably carried by each frame member, and a tool or tools adjustably carried by each tool-bar, substantially as described.

5. The combination with the drag-bar, of a slotted tool-bar carried thereby and capable of having radial and angular adjustment relative thereto, and a tool carried by the tool-bar.

6. The combination with the drag-bar, of a slotted tool-bar adjustably carried thereby, and a tool carried by and adjustable relative to the tool-bar.

7. The combination with a plurality of drag-bars, of a slotted tool-bar carried by each drag-bar, said tool-bars being adjustable relative to each other and radially and angularly relative to their drag-bars, and tools carried by and adjustable relative to said tool-bars.

8. The combination with a drag-bar, of a longitudinally-slotted tool-bar and a tool carried by the tool-bar, said drag-bar and tool-bar each having adjustable connection with the slotted portion of the tool-bar, whereby the tool-bar may have angular and radial adjustment relative to the drag-bar and the tool have longitudinal adjustment relative to the tool-bar.

In testimony whereof I have hereunto signed my name in the presence of two subscribing witnesses.

GEORGE E. HARTER.

Witnesses:
C. W. OWEN,
HARVEY SCRIBNER.